US012749099B2

(12) United States Patent
Lin et al.

(10) Patent No.: US 12,749,099 B2
(45) Date of Patent: Sep. 29, 2026

(54) SYSTEM AND METHOD FOR PROVIDING PRESENTATIONS TO CUSTOMERS

(71) Applicant: United States Postal Service, Washington, DC (US)

(72) Inventors: David C. Lin, Falls Church, VA (US); Barry Russell, Washington, DC (US)

(73) Assignee: United States Postal Service, Washington, DC (US)

(*) Notice: Subject to any disclaimer, the term of this patent is extended or adjusted under 35 U.S.C. 154(b) by 336 days.

(21) Appl. No.: 17/449,424

(22) Filed: Sep. 29, 2021

(65) Prior Publication Data

US 2022/0101391 A1 Mar. 31, 2022

Related U.S. Application Data

(60) Provisional application No. 63/086,022, filed on Sep. 30, 2020.

(51) Int. Cl.

| | |
|---|---|
| ***G06Q 30/02*** | (2023.01) |
| ***G06T 19/00*** | (2011.01) |
| ***G06V 20/20*** | (2022.01) |
| ***G06V 20/52*** | (2022.01) |
| ***G06V 40/16*** | (2022.01) |

(Continued)

(52) U.S. Cl.

CPC ....... *G06Q 30/0281* (2013.01); *G06T 19/006* (2013.01); *G06V 20/20* (2022.01); *G06V 20/52* (2022.01); *G06V 40/174* (2022.01); *G06V 40/23* (2022.01); *G06F 3/017* (2013.01)

(58) Field of Classification Search

CPC .. G06Q 30/0281; G06T 19/006; G06V 20/52; G06V 40/23; G06V 20/20; G06V 40/174; G06F 3/017

See application file for complete search history.

(56) References Cited

U.S. PATENT DOCUMENTS

| | | | | |
|---|---|---|---|---|
| 10,003,840 | B2 * | 6/2018 | Richman | H04N 21/23424 |
| 10,559,019 | B1 * | 2/2020 | Beauvais | G06T 19/006 |
| 10,573,106 | B1 * | 2/2020 | Brady | G06V 40/1365 |

(Continued)

FOREIGN PATENT DOCUMENTS

| | | | | |
|---|---|---|---|---|
| CA | 3028753 | A1 * | 7/2017 | G06Q 20/3829 |
| EP | 3742336 | B1 * | 7/2025 | G06Q 10/08 |

(Continued)

OTHER PUBLICATIONS

Overby, Stephanie "How to explain augmented reality in plain English" Oct. 7, 2019, The Enterprisers Project, https://enterprisersproject.com/article/2019/10/ar-augmented-reality-explained-plain-english (Year: 2019).*

(Continued)

*Primary Examiner* — Gerardo Araque, Jr.

(74) *Attorney, Agent, or Firm* — Knobbe, Martens, Olson & Bear, LLP

(57) ABSTRACT

A system for detecting customer conditions and relevant presentations within an environment, where the presentations correspond to a location within the environment. The system detects customer confusion, boredom, etc., and provides a relevant presentation on a surface within the environment to assist the customer. The system can include one camera, or a plurality of cameras to monitor multiple areas within the environment.

15 Claims, 5 Drawing Sheets

(51) Int. Cl.
*G06V 40/20* (2022.01)
*G06F 3/01* (2006.01)

(56) References Cited

U.S. PATENT DOCUMENTS

| | | | | | |
|---|---|---|---|---|---|
| 10,691,931 | B2 * | 6/2020 | Herring | G06V 20/52 | |
| 11,055,978 | B1 * | 7/2021 | Gray | G08B 13/2494 | |
| 11,416,805 | B1 * | 8/2022 | Piotrowski | G06Q 10/0833 | |
| 11,893,558 | B2 * | 2/2024 | Siddique | G06Q 20/12 | |
| 11,935,376 | B2 * | 3/2024 | Adato | G06T 7/001 | |
| 12,265,994 | B2 * | 4/2025 | Soule | H04L 67/535 | |
| 12,423,740 | B2 * | 9/2025 | Adato | G08B 13/19632 | |
| 12,462,279 | B2 * | 11/2025 | Soule | G06Q 30/0271 | |
| 2008/0249793 | A1 * | 10/2008 | Angell | G06Q 30/02 | 705/1.1 |
| 2013/0009993 | A1 * | 1/2013 | Horseman | G16H 40/63 | 345/633 |
| 2013/0293540 | A1 * | 11/2013 | Laffargue | G06T 3/40 | 345/420 |
| 2014/0267609 | A1 * | 9/2014 | Laffargue | G01B 11/002 | 348/46 |
| 2014/0279648 | A1 * | 9/2014 | Whitehouse | G06Q 10/083 | 705/330 |
| 2015/0262208 | A1 * | 9/2015 | Bjontegard | G06Q 30/0205 | 705/7.31 |
| 2016/0012465 | A1 * | 1/2016 | Sharp | G06Q 20/321 | 705/14.17 |
| 2016/0026032 | A1 * | 1/2016 | Moore | G06F 3/147 | 349/1 |
| 2016/0132822 | A1 * | 5/2016 | Swafford | H04W 4/80 | 705/28 |
| 2016/0134930 | A1 * | 5/2016 | Swafford | A47F 5/0068 | 725/80 |
| 2016/0363990 | A1 * | 12/2016 | Key | G01B 5/00 | |
| 2017/0108838 | A1 * | 4/2017 | Todeschini | G05B 15/02 | |
| 2017/0221088 | A1 * | 8/2017 | Koch | G06F 16/00 | |
| 2017/0337738 | A1 * | 11/2017 | Kepner | G06F 3/04883 | |
| 2018/0121865 | A1 * | 5/2018 | Rubinstein Apozdava | G06Q 30/0283 | |
| 2018/0197139 | A1 * | 7/2018 | Hill | G06Q 10/0838 | |
| 2019/0080339 | A1 * | 3/2019 | Koch | G06Q 30/016 | |
| 2019/0244214 | A1 * | 8/2019 | Flores | G06Q 30/016 | |
| 2020/0286135 | A1 * | 9/2020 | Matayoshi | G09F 3/204 | |
| 2021/0150457 | A1 * | 5/2021 | Key | G06Q 10/083 | |

FOREIGN PATENT DOCUMENTS

| | | | | | |
|---|---|---|---|---|---|
| EP | 3754546 | B1 * | 3/2026 | G06Q 10/08 |
| GB | 2562131 | A * | 11/2018 | B62B 5/0096 |
| KR | 102625456 | B1 * | 1/2024 | B62B 5/0096 |
| WO | WO-2012037290 | A2 * | 3/2012 | G02B 27/017 |
| WO | WO-2015127395 | A1 * | 8/2015 | G06Q 30/0257 |
| WO | WO-2016205074 | A1 * | 12/2016 | G01G 19/52 |
| WO | WO-2018203512 | A1 * | 11/2018 | B62B 5/0096 |

OTHER PUBLICATIONS

S. Martin, "Is the world really ready for this?: Wearable computing devices raise privacy issues, to say nothing of etiquette," USA Today, pp. B.8, 2013 (Year: 2013).*
Anonymous "Tech Now and Ahead," Independent Banker, vol. 64, (11), pp. 34-39, 2014 (Year: 2014).*
J. Heller et al, "Let Me Imagine That for You: Transforming the Retail Frontline Through Augmenting Customer Mental Imagery Ability," J. Retail., vol. 95, (2), pp. 94-114, 2019 DOI: http://dx.doi.org/10.1016/j.jretai.2019.03.005 (Year: 2019).*
Anonymous "AI for Retail," Design : Retail, vol. 30, (3), pp. 14, 2018 (Year: 2018).*
T. Chuang, "Tech-Filled Futureof Shopping," Denver Post, pp. K.3, 2015 (Year: 2015).*
E. C. Baig, "Eye on the future: After checking out Google Glass, reviewer says: Gotta have it," Montgomery Advertiser, pp. n/a, 2013 (Year: 2013).*
Walgreens "Coupons Help Walgreens" Walgreens, Mar. 27, 2016, https://web.archive.org/web/20160327025024/https://www.walgreens.com/topic/help/shophelp/coupons_help.jsp (Year: 2016).*
Georgia Pacific "Coupon Redemption and Retailer Reimbursement Policy" Georgia Pacific, Sep. 1, 2018, https://www.gp.com/legal/coupon-redemption-and-retailer-reimbursement-policy/ (Year: 2018).*
Rule, "How to Use Post Office Self Service Kiosk|Avoid the Long Lines!", Apr. 30, 2016, https://www.youtube.com/watch?v=Qstfv7emOn8 (Year: 2016).*
Escher "Self-Service Kiosk", Aug. 6, 2020, Escher—Self-Service Kiosk (Year: 2020).*
USPS "Sending Packages", Sep. 14, 2019, https://web.archive.org/web/20190924070419/https://www.usps.com/ship/packages.htm (Year: 2019).*

* cited by examiner

SYSTEM AND METHOD FOR PROVIDING PRESENTATIONS TO CUSTOMERS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application claims priority to and the benefit of U.S. Provisional Application No. 63/086,022 filed on Sep. 30, 2020 in the U.S. Patent and Trademark Office, the entire contents of which are incorporated herein by reference.

FIELD

This disclosure relates to using and implementing presentation systems (for example, virtual and augmented reality systems and/or media projection systems). More specifically, this disclosure relates to implementing such systems in retail and/or restaurant settings.

BACKGROUND

Customers of businesses may obtain goods or services for themselves when visiting a business location. In stores, the customers may select items or services that they wish to purchase or use. However, the customers may face issues or have questions or problems with which they need assistance. For example, the customers may need assistance selecting an item or purchasing a good or service, for example using an automated teller or checkout system or requesting a recommendation based on the knowledge of employees of the business. Alternatively, or additionally, when the business offers counter service or similar assistance, customers may wait in a line to obtain the service or assistance.

SUMMARY

Methods and apparatuses or devices disclosed herein each have several aspects, no single one of which is solely responsible for its desirable attributes. Without limiting the scope of this disclosure, for example, as expressed by the claims which follow, its more prominent features will now be discussed briefly. After considering this discussion, and particularly after reading the section entitled "Detailed Description" one will understand how the described features provide advantages that include data authentication services.

In one aspect described herein, a method comprises capturing, via a sensing device, actions of a customer in an environment in which the sensing capture device is installed; determining, via a processor in data communication with the sensing device, a presentation to provide to the customer based on the captured actions; determining, via the processor, a location of the customer based on a comparison of a position of the customer relative to one or more areas in the environment; identifying, via the processor, a presentation to provide to the customer to provide the assistance to the customer based on the captured actions by the customer and the location of the customer; displaying, via a media projector, the presentation to the customer while the customer is located at the location; and terminating the displaying of the presentation to the customer based on at least one of detection of a successful completion of a transaction by the customer or detection of a completion of the presentation to the customer.

In some embodiments, the actions by the customer comprise one or more of gestures, facial expressions, movement, body positioning, or statements by the customer.

In some embodiments, identifying the presentation to provide to the customer comprises identifying a type of presentation for the presentation to the customer and identifying a subject matter for the presentation to the customer.

In some embodiments, identifying the subject matter for the presentation comprises identifying, based on the location of the customer, a good or service with which the customer needs assistance.

In some embodiments, the method further comprises identifying, via the sensing device, interaction of the customer with the presentation while the customer is located at the location.

In some embodiments, the method further comprises identifying a plurality of customers based on detecting entry of the plurality of customers into the environment, wherein an order in which presentations are displayed to the plurality of customers is based, at least in part, on an order in which the plurality of customers entered the environment.

In some embodiments, the method further comprises transmitting a notification to an employee based on a determination that the presentation did not result in the successful completion of the transaction, wherein the notification includes details of the customer's actions that triggered the presentation and customer actions during the presentation.

In some embodiments, displaying the presentation to the customer comprises identifying the media projector to use to display the presentation to the customer.

In some embodiments, the media projector comprises one or more of an augmented or virtual reality display device, a holographic projector, a video projector, a video screen, and a mobile computing device.

In some embodiments, displaying the presentation to the customer comprises overlaying the presentation onto a surface near the location and wherein the media projector comprises an augmented reality display device.

In another aspect described herein, a system comprises a sensing device configured to capture actions by a customer in an environment in which the sensing device is installed; a processor in data communication with the sensing device, the processor configured to: determine a location of the customer based on a comparison of a position of the customer relative to one or more areas in the environment; determine from a plurality of presentations, a presentation to present to the customer based on the captured actions by the customer and the location of the customer; and a media projector configured to display the identified presentation to the customer while the customer is located at the location.

In some embodiments, the captured actions by the customer comprise one or more of gestures, facial expressions, movement, body positioning, or statements by the customer.

In some embodiments, the system further comprises a camera in communication with the processor and configured to observe one or more areas of the location.

In some embodiments, the processor is configured to identify the presentation to present to the customer based on a determination of a good or service with which the customer needs assistance.

In some embodiments, the processor is further configured to receive an interaction of the customer with the presentation while the customer is located at the location.

In some embodiments, the sensor is further configured to identify a plurality of customers based on detecting entry of the plurality of customers into the environment, wherein an order in which presentations are displayed to the plurality of customers is based, at least in part, on an order in which the plurality of customers entered the environment.

In some embodiments, the processor is further configured to transmit a notification to an employee based on a determination that the presentation did not result in the successful completion of the transaction, wherein the notification includes details of the customer's actions that triggered the presentation and customer actions during the presentation.

In some embodiments, the processor is further configured to select a media projector from a plurality of media projectors in the environment corresponding to the determined location of the customer.

In some embodiments, the media projector comprises one or more of an augmented or virtual reality display device, a holographic projector, a video projector, a video screen, and a mobile computing device.

In some embodiments, the media projector is configured to overlay the presentation onto a surface near the location.

BRIEF DESCRIPTION OF THE DRAWINGS

These drawings and the associated description herein are provided to illustrate specific embodiments of the invention and are not intended to be limiting.

DETAILED DESCRIPTION

Figure 1:
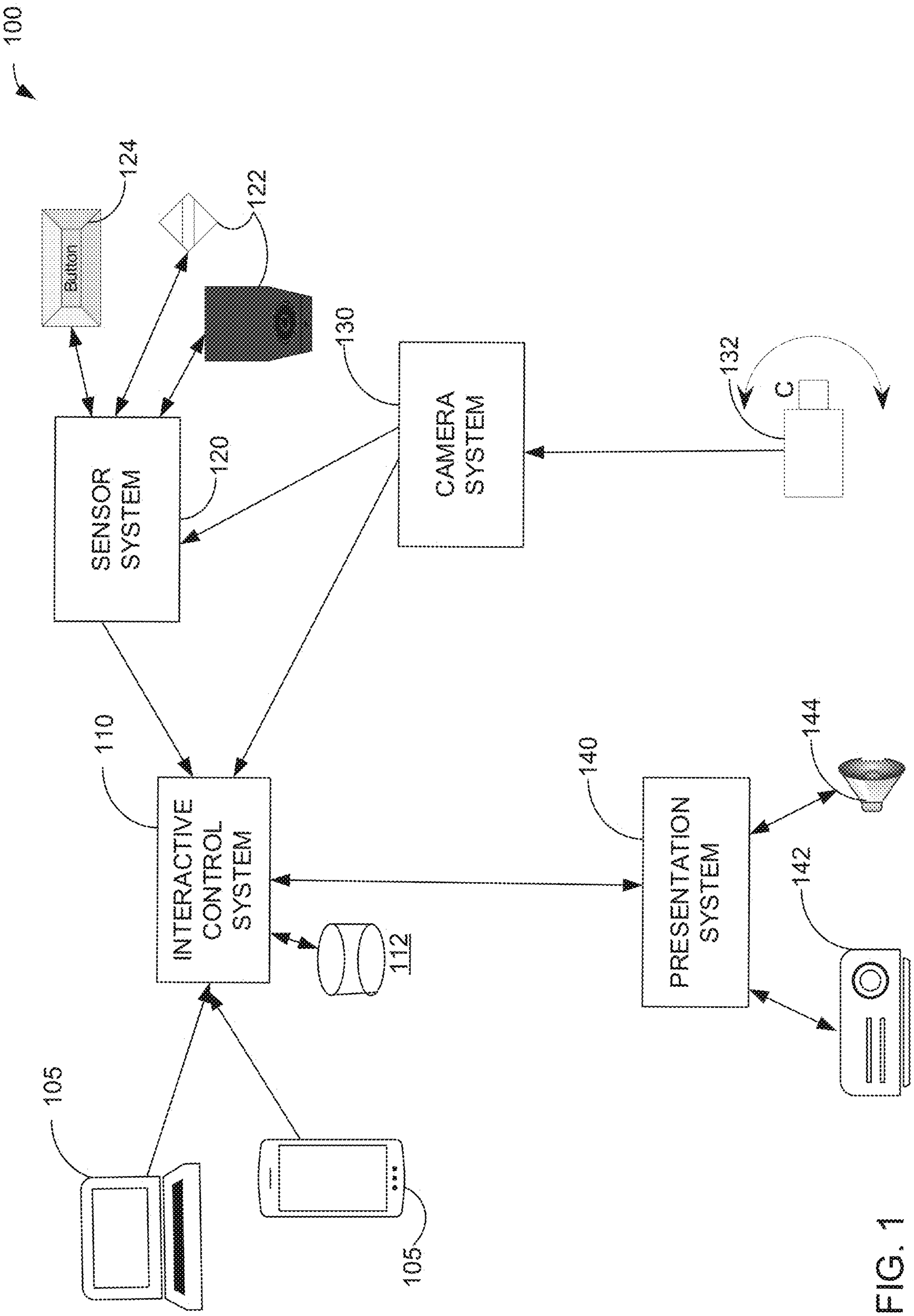
FIG. 1 is a block diagram of an exemplary intelligent interactive control system, as described herein.

The features, aspects and advantages of the present development will now be described with reference to the drawings of several embodiments which are intended to be within the scope of the embodiments herein disclosed. These and other embodiments will become readily apparent to those skilled in the art from the following detailed description of the embodiments having reference to the attached figures, the development not being limited to any particular embodiment(s) herein disclosed.

The present disclosure relates to systems and methods for enabling intelligent and interactive projections in various environments, for example, retail and/or restaurant settings. In the retail setting, customers may browse, research, purchase, and/or otherwise interact with goods and/or services of interest. However, many such locations may have available for the customer services and/or goods that the customer is unable to select without additional assistance, for example from an employee that works at the retail setting. Furthermore, certain customers or people with the customers in the retail setting may be or become bored, uninterested, or preoccupied while in the retail setting.

Many retail locations have many employees to assist the customers. However, sometimes, there may not be enough employees to track actions and locations for all the customers in the location at a single time. In some locations, the setting maybe be advantageously automated, reducing the number of employees present. Furthermore, the employees may have difficulties tracking whether one or more of the customers need assistance before those customers become frustrated or upset. Systems and methods described herein related to the disclosed technology may provide various benefits over simply having employees in the location to assist the customers. The systems and methods described herein can promote or enable automation, improve efficiency, reduce wait times, alleviate frustration, and the like.

Many of the retail locations, service counters, post offices, or similar settings may advantageously employ computerized projection systems to augment customer interactions with the location and to assist and provide entertainment to customers that are visiting the locations. Such systems may be able to identify when a customer needs assistance based on various analyses. For example, the systems may analyze the customer's actions, facial expressions, gestures, movement, statements, speech, and so forth. Similarly, the systems may identify and analyze a location of the customer in the setting, and may determine whether the customer is holding an item. For example, if the systems detect that a customer entered a post office setting with an item packaged in a box, moved to a self-service kiosk, and now looks confused based on the facial expressions and actions of the customer, the systems may determine that the customer needs assistance with the self-service kiosk and provide the customer with an appropriate presentation (for example, directed to assisting with use of the self-service kiosk) or alert an employee that the customer may need assistance. The presentation can be projected on a wall, a desk, or other surface, can be a holographic display, or other type of display. In some embodiments, the system can identify a Bluetooth® address or identifier, or other similar identifier for a mobile computing device of a customer. The presentation can then be sent to the mobile computing device of the customer. In some embodiments, a customer can have an application registered with the service counter, retail location, etc. When confusion is detected, or when the customer requests help, for example, from the application, the system can cause the application to show the presentation in the application. Alternatively, or additionally, the systems may identify when the customer (or a visitor accompanying the customer) is bored, uninterested, and/or preoccupied when in the setting. The systems may determine this based on the analysis of the customer's or visitor's actions, facial expressions, movements, location, speech, statements and so forth and, in response, provide an entertaining presentation to the customer or visitor. For example, the entertaining presentations may include one or more of interactive learning games (that can be curated to the location), trivia presentations, educational content, historical information for the location or associated company, and so forth. In some instances, the entertaining presentation may be interactive among a number of customers or visitors simultaneously.

The systems may capture information for or about the customers in the location using various sensors, including cameras, acoustic sensors, presence sensors, wireless communication modules, and various other sensors. For example, the systems include processing hardware that analyzes the information received from and/or about the customer via cameras and other sensors, for example acoustic sensors. For example, the cameras and software may monitor facial expressions, movements, location, body poses, and gestures of the customer, among other features of the customer. For example, this information may allow the systems to determine whether the customer is confused and trigger assistance for the customer to alleviate the confusion. For example, if the customer appears confused and is in the location or zone associated with the self-service kiosk, the systems may present the customer with a presentation showing the customer how to work with the self-service kiosk or another way to obtain assistance, or providing assistance directly.

Similarly, the camera may identify when the customer is bored, restless, or preoccupied when in the setting or location, and is, for example, standing in line. Based on this determination, the systems may present the customer with entertainment. The presentations to the customer can overlay surfaces in the vicinity of the customers, for example along a nearby wall, a horizontal or vertical divider, the floor, a counter or desktop, and so forth. In some instances, the overlay can be placed over items available for purchase to enable the systems to identify particular items, and so forth. Furthermore, the system may interact with the customers through electronic devices that the customer has (for example, cell phones, laptops, wireless headsets, and the like). For example, the systems can communicate with these electronic devices wirelessly and/or using a customer profile in an application installed on the electronic device. In some embodiments, the display can be an interactive display with which the customer can interact directly.

In some instances, the systems may capture information for a single retail location and merge that information with similar information from a number of other retail locations, such as similar types of retail locations. Thus, the systems can operate using a larger set of aggregated data. By using the larger set of data, the systems can better predict when customers need assistance and what presentations will best assist the customer, based on the information described herein. In some instances, the systems may implement one or more machine learning algorithms to analyze the data from one or more locations and to improve determinations of when customers need assistance and/or entertainment and/or what presentations to provide to the customers. For example, the systems may implement one or more of a linear or logistic regression algorithm, decision tree algorithms, and/or the like to help identify when the customers need assistance based on the collected facial expressions, gestures, movements, statements, and the like from the customers at multiple locations over a period of time. Further details will be provided below.

Based on the captured and analyzed customer information and location and/or time information, the system may determine a best presentation to present to the customer. In some instances, the presentation is curated based on the location of the customer in the setting as well as regional information, time, location, and the like. For example, when the customer is in front of the self-service kiosk in a post office during tax season and the customer is mailing an envelope, the systems that detect that the customer is confused or may need assistance may provide a presentation related to common difficulties or questions related to the self-service kiosk and the relevant time of day, day of the week, time of a month, time of year, etc. Additionally, the systems may provide information that may be useful during tax season, such as mailing address information for a tax office where items mailed (specific to the geographic location of the post office) may be sent or a checklist of items for the customer to ensure appropriate items are being sent. Similarly, when the customer is mailing an item during a holiday season, the presentation provided to the customer in need of assistance may include reminders or suggestions regarding what services to select based on corresponding dates of the holidays (for example, to help the customer identify which services will enable delivery of the item on or before the holiday). Thus, the systems herein can account for location and actions of the customer and other additional, external factors or information, in order to determine which presentation(s) would be most appropriate for the customer to maximize a likelihood of a positive customer experience at the location. In some instances, the positivity of the experience is measured based on the successful completion of an interaction (for example, successful purchase of a service or good).

Furthermore, the system may enhance interactions between the customers and employees of the location. For example, information gathered by the system can be used to provide the employees with information to assist the customers. For example, if the system identifies that the customer is confused and any provided interactive presentation has not been sufficient to enable the customer to complete a transaction, the system may notify one of the employees and provide the employee with information about the customer's confusion, steps taken by the system, and so forth. Thus, the systems can augment the interactions between the customers and the location.

As used herein, the term "item" may refer to discrete articles in the distribution network, such as mail pieces, letters, flats, magazines, periodicals, packages, parcels, goods handled by a warehouse distribution system, baggage in a terminal, such as an airport, etc., and the like. The term item can also refer to trays, containers, conveyances, crates, boxes, bags, and the like. As used herein, the term "carrier" may refer to an individual assigned to a route who delivers the items to each destination. The term may also refer to other delivery resources, such as trucks, trains, planes, automated handling and/or delivery systems, and other components of the distribution network. The disclosed technology provides for such systems and methods related thereto for determining when customers need or could be helped with assistance and providing such assistance to the customers in a public retail or similar setting using a combination of sensors, computing hardware, and interactive media components.

FIG. 1 is an exemplary block diagram of an intelligent interactive projection system 100, as described herein. The projection system 100 includes an interactive control system 110, a sensor system 120, a camera system 130, a presentation system 140, and input devices 105. In combination, the sensor system 120, the camera system 130, and the presentation system 140 may enable the projection system 100 to monitor customers in an environment and provide assistance and/or entertainment to the customers based on a suite of interactive interfaces. Such interfaces may be integrated with the environments, for example using augmented reality considerations or individual electronic devices of the customers to provide the assistance and/or entertainment.

The sensor system 120 may comprise one or more sensors 122 that detect various conditions in an environment in which the sensors and the projection system 100 are disposed. In some instances, the sensors 122 may comprise an audio sensor configured to detect and/or otherwise receive verbal cues or interactions. In some instances, the sensors 122 may comprise a presence sensor that can automatically detect the presence of a customer or a button 124 that can be actuated by the customer to indicate presence in a location. The button 124 can be an actual button or a virtual button, which is, for example projected onto a surface, or which is located on a customer's mobile computing device. In some embodiments, the sensors 122 can comprise a camera to detect presence, customer states, etc. in some embodiments, the sensors 122 can comprise any combination of the foregoing and/or additional sensors.

In some embodiments, a customer in a retail facility who faces confusion or has a question can, using an application on the customer's mobile device, press a help button in the application to initiate the processes herein. The location of the device can be determined using sensors or detectors in the facility, and the presentation relevant to the customers location in the setting or facility can be triggered. In some instances, one or more of the sensors 122 may communicate with electronic devices belonging to the customers, for example via Bluetooth or similar wireless capabilities. The sensors 122 detect presence of the electronic devices and use such detection to identify a location of one or more customers. Furthermore, the sensors 122 can determine where, when, and/or how a presentation is provided to the customers, as discussed in more detail below.

In some embodiments, using a single camera can be advantageous, to reduce costs and to reduce system complexity. When using a single camera, the camera is positioned at a location in the facility that has a clear or unobstructed view of each of the zones or locations such that it can determine in which zone a customer is located who needs help or looks confused. In some embodiments, if there is no position in the facility where a single camera can see each zone or location, additional cameras can be used. In some embodiments, if a high volume of customers are present, or if some areas have higher confusion, there can be multiple cameras, such as a camera dedicated to a single zone or a subset of zones. In some embodiments, the system can have more than one camera for speed, maximum coverage, etc. in some embodiments, one single camera may not be able to see facial expressions for customers in each zone, but may only see the backs of customers in certain zones. In such cases, alternate or additional cameras can be used. In some embodiments, a camera should be positioned such that each zone or location is in a separate line of sight or field of view. That is, the camera can avoid being placed in a location where a first zone is in the foreground, and a second zone is in the middle distance or is farther away from the camera in a line than the first zone. The number of cameras can be determined based on facility layout, cost, efficiency, speed, numbers of customers, numbers of zones, and the like.

The camera system 130 comprises one or more cameras disposed in the environment. The camera system may comprise one or more cameras 132 can are adjustable via one or more of panning, tilting, zooming, and/or positioning. For example, the cameras 132 can pan and/or tilt to capture an image of the environment in all directions relative to the cameras 132. In some instances, where multiple cameras 132 are located around the environment, different cameras 132 may have different capabilities with respect to panning, tilting, zooming, and/or positioning. For example, some cameras 132 positioned in corners of the environment may have limited panning capabilities but increased zoom capabilities as compared to a camera 132 positioned in or near a center of the environment. Similarly, ceiling mounted cameras 132 may have limited tiling capabilities as compared to a camera 132 mounted on a pedestal. The cameras 132 may be configured to capture one or more of movement of customers, locations of customers, locations of items, location of employees, location of stations or zones, and so forth, relative to the environment. The cameras 132 may be further configured to detect and/or capture the movements, gestures, facial expressions, and other actions of the customers, where such information may be used to interact with the projection system 100.

The presentation system 140 may comprise various components related to providing a presentation to the customers. In some embodiments, these components comprise a projector, video screen, or similar optical presentation device (referred to herein as projectors 142). In some embodiments, the presentation screen 140 may include and/or integrate with electronic devices belonging to the customers. The presentation system 140 may include independent presentation devices 142 that include or exclude audio components 144. The audio components 144 may provide audible communications to the customers. In some instances, the presentation system 140 comprises multiple projectors 142 and audio components 144 combinations located at different locations in the environment or one or more projector 142 and audio component combinations that are movable about the environment. In some instances, the combination of the projector 142 and the audio component 144 automatically moves about the environment as the interactive control system 110 determines or identifies different customers with which the presentation system 140 is to interact. For example, as described in further detail below, if the interactive control system 110 identifies a customer who needs help selecting an item to purchase (for example, selecting between different sized containers), the presentation system 140 may present a video or similar media presentation file that helps the customer select the appropriately sized container. In some instances, the presented presentation is interactive and enables the customer to interact with the presentation system 140. For example, when assisting the customer to identify an appropriately sized container, the presentation system 140 may allow the customer to enter dimensions of an item to be placed in the container, and so forth. Thus, the presentation system 140 may comprise one or more input devices, for example the input devices 105. Thus, the customer may use the customer devices to interact with the projection system 100. In some embodiments, the projector 142 comprises a touch screen or similar interactive display component. In some instances, the projector 142 can display one or more contact points (for example, digitally displayed buttons or interactive visual pieces) and the camera 132 can track or identify when the customer interacts with the buttons 124 or interactive pieces.

In some instances, the computing devices 105 correspond to devices that the customers can use to interact with the interactive control system 110 or any of the other components of the projection system 100. For example, the computing devices 105 may comprise the customer devices described herein, for example the customer's mobile phone, laptop, or similar computing device.

The interactive control system 110 may comprise a computing system or similar control hardware (for example, as described in further detail with respect to FIG. 4 below) used to manage the interactions between the camera system 130, the sensor system 120, and the presentation system 140 and customer devices (i.e., the computing devices 105). In some instances, the interactive control system 110 comprises a database or similar data store 112 that stores presentations or similar media files or programs presented by the presentation system 140. The interactive control system 110 may manage access to the data store 112 so that the presentation system 140 presents particular presentations, etc., when specific conditions are met. Further details of how the various components shown in the projection system 100 provide assistance and/or entertainment to the customers is provided below with respect to FIGS. 2A and 2B below.

Figure 2A:
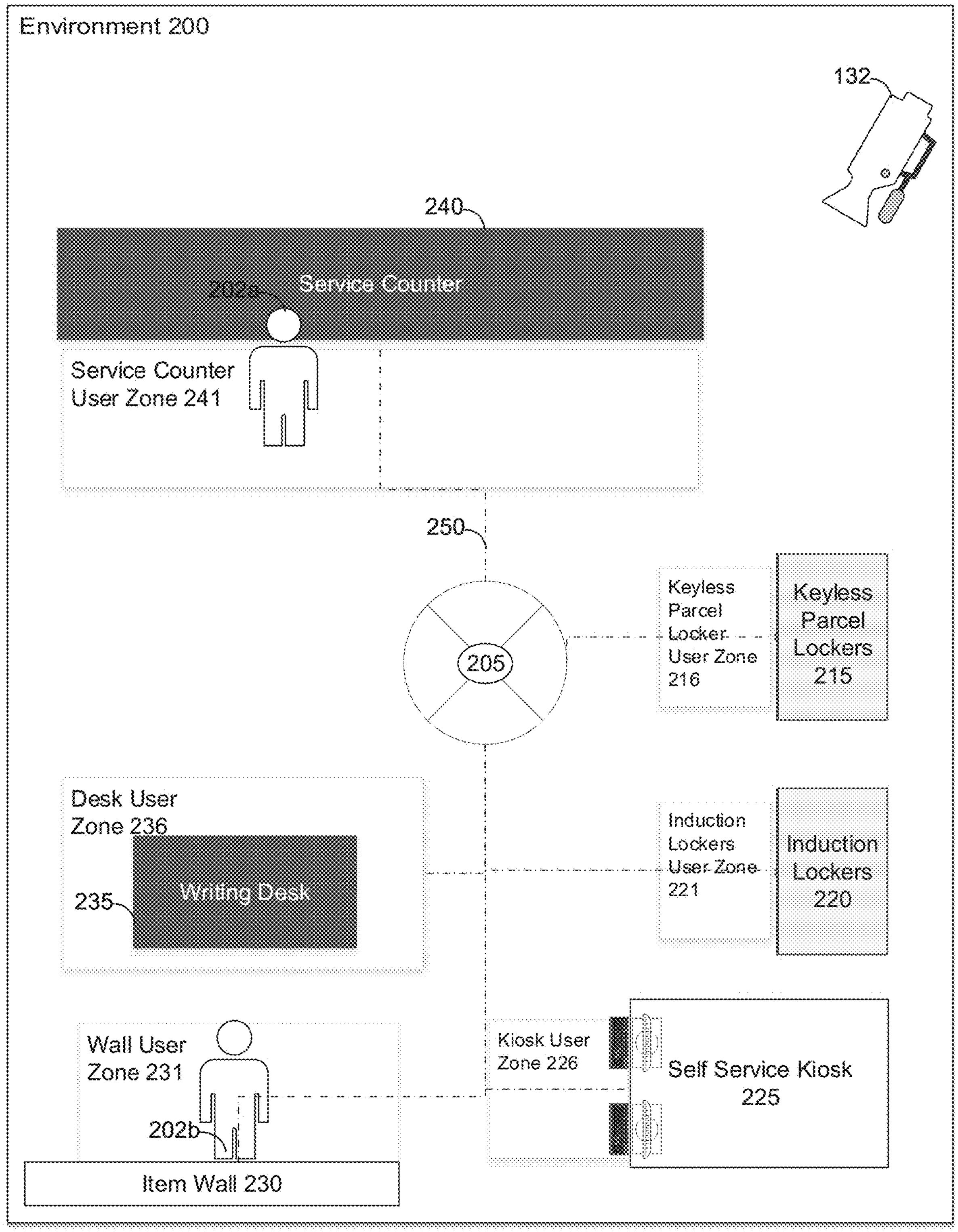
FIG. 2A depicts an example layout of a location and equipment of a projection system.
Figure 2B:
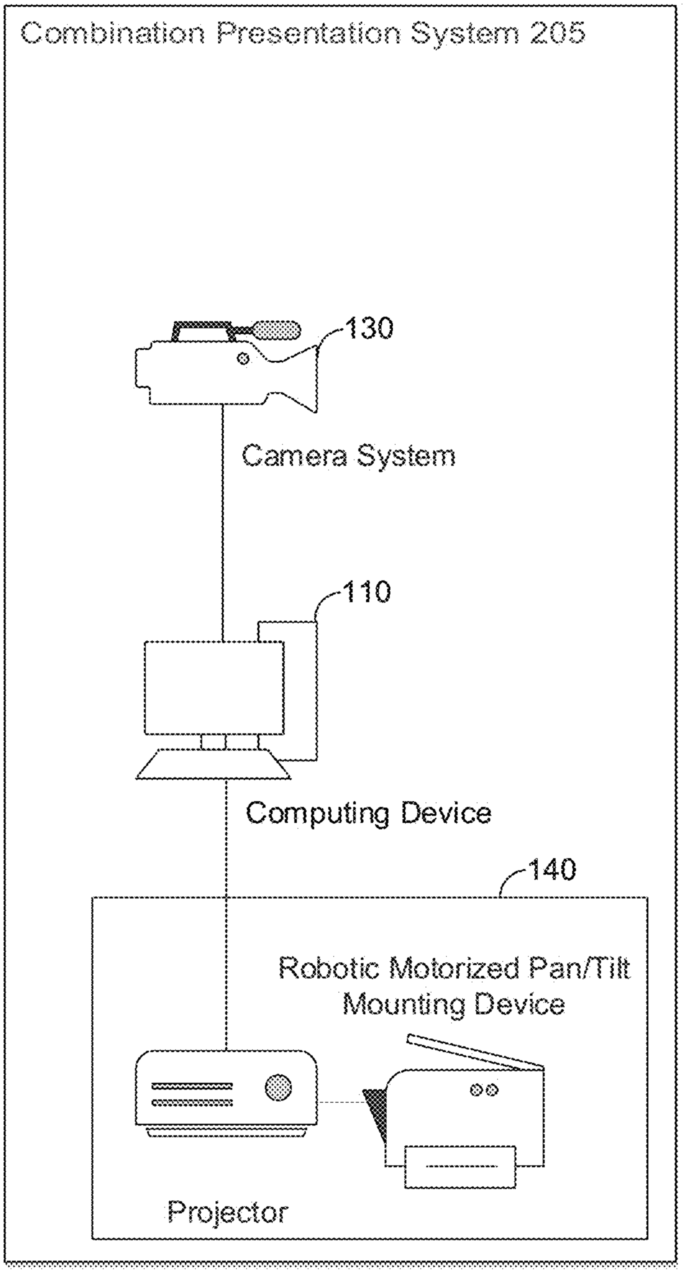
FIG. 2B depicts an exemplary presentation system.

FIG. 2A depicts an example layout of a location and equipment of a projection system. FIG. 2B depicts an exemplary presentation system. FIG. 2A shows a representative layout of the environment (for example, a post office location) that employs the presentation system to assist and/or interact with customers that enter an environment, setting, location, etc. An environment 200, similar to many retail and restaurant (and similar) settings, includes various locations in which different items or services are available to the customer. As shown, the environment 200 of the post office may include one or more users 202*a-b* and one or more service locations, including, keyless parcel lockers 215, induction lockers 120, a number of self-service kiosks 225, an item wall 230, a user desk 235, and a service counter 240. Each of the keyless parcel lockers 215, the induction lockers 120, the number of self-service kiosks 225, the item wall 230, the user desk 235, and the service counter 240 also comprise corresponding user zones. For example, the keyless parcel lockers 215 comprise a keyless parcel locker user zone 216, the induction lockers 220 comprise an induction locker user zone 221, the self-service kiosks 225 comprise a kiosk user zone 226, the item wall 230 comprises a item wall user zone 231, the writing desk 235 comprises a desk user zone 236, and the service counter 240 comprises a service counter user zone 241. The zones can be stored on a virtual map of the environment. When the camera and/or sensors identify a customer exhibiting confusion or needing assistance, the system identifies which zone the customer is in based on the direction the camera is pointing, the location of the detected customer relative to the virtual map of zones, etc.

The environment 200 also includes a combination presentation system and sensor/camera sensor 205 (referred to herein as the combination presentation system 205). The combination presentation system 205 may comprise one of the presentation system 140, one of the cameras 132, and a movable base. The movable base may comprise one or more components that enable the combination presentation system 205 to move around the environment 200, for example along a predefined path 250 or freely in the environment. For example, the movable base may be ceiling mounted to enable the corresponding presentation system 140 and camera 132 to be moved around the environment 200 to different locations in the environment 200. Alternatively, the movable base may comprise a robotic or similar device that can maneuver itself (and the presentation system 140 and the camera 132) around the environment 200 along the floor or other horizontal and/or vertical surfaces. Thus, the movable base can enable the corresponding presentation system 140 and camera 132 to move around the environment 200 and help different customers 202 regardless of what zone they are in or whether they are in line waiting for service. In some instances, the movable base may enable the corresponding presentation system 140 and camera 132 to move around the environment 200, for example aligning itself with a wall of the environment near the customer or over a table or countertop to provide the interactive presentation to the customer 202.

The projection system 100 as disposed in the environment 200 may comprise the camera 132 and the combination presentation system 205. When disposed in the environment 200, the projection system 100 may monitor the environment 200. Specifically, the projection system 100 may identify when customers 202 (for example, the customer 202*a* and/or the customer 202*b*) enter or are in one of the user zones identified, when they are waiting in a line, inside of or outside of one of the user zones, and so forth. For example, the sensors 122 and/or the cameras 132 may detect locations of the customers 202. Specifically, one or more of the zones, the floor, the ceiling, and any other components of the environment 200 may comprise one or more sensors 122. The sensors 122 may enable the projection system 100 to identify where the customers 202 are located in the environment 200 and when the customers 202 are located in a particular zone. For example, proximity sensors 122 may be disposed along an edge of the keyless parcel lockers 215 such that they only detect one of the customers 202 when one of the customers 202 is in the keyless parcel locker user zone 216. Thus, the sensors 122 in a particular zone or configured to detect when one of the customers 202 is in a particular zone. Based on the customer 202 location in the particular zone, the projection system 100 may assume that the customer is working with, waiting for, or working to obtain a service or good associated with the service location corresponding to the zone in which the customer 202 is located.

In some embodiments, the camera 132 mounted in the environment 200 or the camera 132 of the combination presentation system 205 may monitor locations and actions of customers 202 in the environment 200. As noted above, the actions may comprise gestures, movements, facial expressions, body pose, and similar aspects of the customer 202. This information captured by the cameras 132 can be used to determine when the customer 202 needs assistance or is bored or preoccupied. Accordingly, the projection system 100 (of which the camera 132 mounted in the environment 200 and the camera 132 of the combination presentation system 205 are a part) may determine that the customer 202*a* is waiting in line for assistance at the service counter 240. As described herein, the projection system 100, and specifically the interactive control system 110, may determine when the customer 202 needs assistance. For example, the interactive control system 110 may learn, via machine learning or similar algorithms, what actions, expressions, etc., by the customer 202 are indicative of the customer 202 needing assistance. For example, the interactive control system 110 may identify that one or more particular facial expressions, movements, body poses, verbal statements or utterances, and timing in a location, and so forth, indicate that the customer 202 needs assistance. For example, the projection system 100 may identify that the customer 202 has been in front of the self-service kiosk 225 for 5 minutes with only a single item while that the average customer only uses the self-service kiosk for 3 minutes. Based on this timing discrepancy, the interactive control system 110 may determine that the customer 202 needs assistance with the self-service kiosk 225. Similarly, if the customer is standing in the induction lockers user zone 221 and appears to be struggling with one of the induction lockers 220, for example as assessed based on identifying the physical movements of the customer 202 relative to the induction locker, movements of the customer 202 looking for assistance, or detection of utterances by the customer about why the locker will not open or close. Based on this assessment, the projection system 100 can initiate a presentation to the customer using the combination presentation system 205 that moves to a location near the customer 202 struggling in the induction lockers user zone 221 to display an appropriate presentation or alerts an employee that the customer needs assistance. For example, the interactive control system 110 may apply one or more of the linear or logistic regression algorithm, the decision tree algorithms, and the like to the information captured regarding one or more customers 202. Applying any of these machine learning algorithms may comprise an initial training of the algorithms using a training data set before being used to solve queries and the like. Based on the application of these algorithms, the projection system 100 may detect, for example, confusion, boredom, and the like. In some instances, the interactive control system 110 using the machine learning to determine the most common points of confusion in the location.

The projection system 100 may be configured to identify particular actions by the customer 202 in conjunction with the location of the customer 202 to identify what the customer 202 is doing. For example, the projection system 100 tracks the customer 202*a* as being located in the service counter user zone 241 and moving slowly along a defined path that other customers 202 (not shown) have previously followed or are also following. Thus, the projection system 100 may determine that, based on these actions of the customer 202 (the slow movements in the path) and the location of the customer 202*a* in the service counter user zone 241, that the customer 202*a* is in line in for the service counter 240.

Furthermore, the projection system 100 may determine whether the customer 202 needs assistance or entertainment. For example, the projection system 100, via the interactive control system 110, analyzes the data captured by the cameras 132 (for example, the gestures, facial expressions, body pose, statements and/or utterances, and the like) using one or more machine learning algorithms to determine whether the customer 202 needs the assistance or entertainment. For example, the interactive control system 110 may determine that the customer 202 does not need assistance or entertainment when the analysis of the data captured by the cameras 132 shows that the customer 202 entered the environment 202 and worked to obtain a good or service without any evidence of confusion or need for assistance or entertainment when certain conditions are met in the captured data.

Similarly, the camera 132 and/or the combination presentation system 205, in combination with the interactive control system 110, may determine that the user 202*b* is standing in front of the item wall 230 and viewing packaging items, for example a selection of tape, boxes, envelopes, and other packaging materials. In some embodiments, the projection system 100 may provide an augmented reality interface to assist the customer 202*b* with selecting the appropriate packaging materials. For example, in the augmented reality interface, the projection system 100 may request or automatically detect (via the cameras 132) information regarding an item that the customer 202*b* is wanting to ship. In some instances, such an interface may be presented to the customer 202*b* through the customer device 105 of the customer 202*b* or through a display on the item wall 240 the floor, and so forth. In some instances, the augmented reality display may identify an item most appropriate for the customer 202*b* on the item wall 240 by highlighting it or shading it using the projection system 100 (for example, the presentation system 140 of the combination presentation system 205).

In some embodiments, the camera system 130 may utilize the different cameras 132 to identify particular zones in the environment, for example the zones 216, 221, 226, 231, 236, and 241, as introduced above. The camera system 130 may identify these zones by using a virtual map of the facility and identifying a portion of the map in which the customer is located. The zones can be generated by dividing a virtual map into zones, by geofencing, sensors, or similar functionality to identify particular portions of a floorplan of the environment 200 that are affiliated with specific locations and which can correspond to a zone. For example, the kiosk user zone 226 may exist as a designated area such that the cameras 132 identify customers 202 within the depicted zone 226 as being associated with or working with the self-service kiosk 225. Similarly, each of the depicted zones may have their own virtual boundaries/locations specific to that zone so that the projection system 100 can determine when the customers 202 are in particular zones for selection of the type of presentation to provide to the customer. In some instances, since different locations in the environment 200 may have different perspectives of the environment 200, multiple cameras 132 located around the environment 200 provide a better opportunity to determine locations of customers 202 as compared to a single camera 132 located in the environment 200. Furthermore, because positioning and/or orientation of the camera 132 relative to each customer 202 may limit the ability of the camera 132 to capture information about the customer 202, including customer movement, gestures, facial expressions, pose, and so forth, multiple cameras disposed at different locations in the environment may maximize data collection capabilities and improve the likelihood that the projection system 100 will be able to detect customer confusion, boredom, and so forth and provide appropriate presentations to assist and/or entertain the customer 202.

In some embodiments, the project system 100, as introduced above, may apply one or more machine learning models or algorithms to identify which presentation would best be served to provide to the customer based on the identified customer actions, introduced above. The project system 100 may also use the machine learning models to select the presentation that will best respond to the customer's confusion and the location for where the customer 202 is located. For example, for the customer 202*b* may be located in the item wall user zone 231 and the project system 100 may determine that the customer 202*b* is confused. Based on this information, the project system 100 may apply a machine learning model to select the best presentation for the customer 202*b*. In some instances, the machine learning may be applied to identify (and indicate to the customer) most commonly customer selected requests and/or responses to further assist in identifying presentations to provide to the customers 202.

In some embodiments, the projection system 100 may interface with the customer device 105 of the customer 202*a* to attempt to identify what services that the customer 202*a* is going to the service counter 240 to receive. In some instances, the projection system 100 may display entertainment to the customer 202*a* as the customer 202*a* is waiting in line. Alternatively, the projection system 100 may present the customer 202*a* with an interactive menu of services available at the service counter 140 so that the customer 202*a* can pre-select the services needed. In some instances, the customer 202*a* can use their own device (e.g., the customer device 105) to receive the interactive menu or the projection system 100 can display the interactive menu on the floor around the customer 202*a* or on a substantially vertical surface (for example, a wall or divider service).

In some instances, the projection system 100 may utilize multiple camera systems 130, sensor systems 120, and/or presentation system 140 integrated with a single interactive control system 110. By utilizing a single control system 110 operating with a number of camera systems 130, sensor systems 120, and presentation system 140, the projection system 100 may optimize efficiencies of data collection and analysis because all data is collected at and processed by a centralized processor. This may avoid need for communicating information between processing systems, which may introduce delays. In some instances, utilizing a single interactive control system 110 minimizes a number of software keys needed to operate various equipment (for example, the cameras 132, the sensors 122, and the presentation systems 140). In some instances, sensors 122 (for example, via the sensor system 120) and/or cameras 132 includes local processing, for example at the sensor system 120 and/or the camera system 130, respectively.

Various arrangements of cameras 132 in the environment 200 may enable the customer detection and interaction capabilities of the projection system 100, as described herein. For example, In some instances, a number of cameras 132 in the environment 200 can be reduced by locating the cameras 132 having sufficient capabilities (panning, tilting, zooming, etc.) to maximize view in the environment. Alternatively, functionality can be divided between different cameras 132. For example, in a multi-camera environment, a first camera cay be used to monitor customer actions and perform confusion detection while a second camera can be used to monitor customer interaction with presentations. In some embodiments, a single camera 132 can perform both confusion detection and interaction detection while a second camera 132 monitors the environment 200. However, splitting confusion detection monitoring between multiple cameras 132 can help improve the confusion detection because multiple cameras 132 are likely to capture more customer actions as compared to a single camera 132. In some instances, when multiple cameras 132 are implemented, individual cameras 132 may be focused on particular areas or zones of the environment 200. For example, the environment 200 may utilize six cameras 132, one each of the keyless parcel locker user zone 216, the induction lockers user zone 221, the kiosk user zone 226, the item wall user zone 231, the writing desk user zone 236, and the service counter user zone 241. Thus, the cameras 132 may detect when customers 202 are in the corresponding area (for example, via geofencing and/or similar location determination means) and also detect confusion for the customers 202 in the corresponding area or zone. In some instances, when the projection system 100 determines that there are no customers 202 in a zone, the camera 132 and/or sensors 122 in that zone may be used for other purposes, for example customer 202 actions in another zone or location detection for the customer 202 in another zone. Accordingly, the projection system 100 may determine what customers 202 are confused, what is the cause of their confusion, and what presentation to provide to the customers 202 to reduce the confusion.

In some instances, multiple presentation systems 140 may be used to provide the interactive presentation to the customer(s) 202, enabling the projection system 100 to provide services and assistance to multiple customers 202 at a given time. For example, when multiple presentation system 140 exist in the environment 200, the presentation systems 140 may be tied to particular zones such that they provide presentations to customers 202 that enter particular areas or zones but no other zones or areas. When the project system 100 identifies multiple customers 202 in a given location or zone, the presentation system 140 may provide presentations to the customers 202 in an order in which they entered the corresponding zone.

In some embodiments, the cameras 132 may be designed and/or positioned in the environment to capture an entire virtual space for the environment 202. The interactive control system 110 may identify each zone in the environment 202 (for example, using the geofencing and similar methods) and label the corresponding spaces in the virtual space, accordingly. Should the interactive control system 110 determine that there are confused customers 202 in each zone, then the interactive control system 110 may queue up presentations in each zone. When only one presentation system 140 exists in the environment, the presentation system 140 may present to the customers 202 in an order that they entered the environment 202 or their respective locations. When multiple presentation systems 140 exist, multiple presentations can be provided to different customers 202 simultaneously. The interactive system 100 may monitor the zones via the cameras 132 or other sensors 122 in a sequential order to monitor for user request for assistance or confusion. In some instances, the customers 202 may navigate interactions with the presentations using gestures, movement, and the like. In some instances, the presentations provided by the presentation systems 140 may continue to play until the presentation is completed or until the customer 202 completes the corresponding task.

In some embodiments, when the environment 200 includes multiple cameras 132, a first camera may cycle through monitoring of the zones in the environment 200 while a second camera may monitor gestures, actions, statements, and body poses of the customers 202. By integrating information from multiple cameras 132, the interactive control system 110 may improve accuracy of customer location detection and/or action detection because the cameras 132 could be located for better capture of gestures and poses. Furthermore, the projection system 100 may comprise a software layer that determines/calibrates cameras to determine between actions in different zones.

In some embodiments, the presentation system 140 may overlay a presentation such that certain locations (for example, on a wall or countertop) may integrate external sensors or markers to provide instructions to the users how to request additional assistance. For example, the interactive control system 110 may use other sensors and/or detect tapping at particular location (for example, a location where a physical button is placed), a swipe, or a wave at location, etc.

In some instances, the projection system 100 can predict why one of the customers 202 is at the location based on identification of what the customer is carrying or detection of the customer's device 105 that is recognized by the projection system 100 (for example, via a known wireless communication identifier or customer profile). For example, the projection system 100 may utilize an application locally installed on the customer's device 105 when the customer 202 uses the device 105 to interact with the projection system 100. Such use may result in a customer profile associated with the projection system 100, and the projection system 100 may use the customer profile to identify when the customer 202 is in the location and determine what assistance the customer 202 may need on subsequent visits. Based on such profile or other detected information, the projection system 100 may provide the customer 202 with information regarding detected conditions. For example, if the customer is standing in line at the services counter 240 but there is a shorter line available, the projection system 100 may indicate the shorter line and suggest that the customer 202 move to the shorter line. Such an indication may occur via the customer device 105 or through an augmented reality or similar display or presentation. For example, the presentation system 140 may display a path on the floor or on the ceiling or on some other surface from the customer's current location to the shorter line, etc. In some instances, the presentation system 140 may use audible prompts to the customer 202 to the shorter line or otherwise direct the customer 202 between the locations.

In some instances, for example, when the environment 202 is the post office location, the projection system 100 may identify when the customer 202 is carrying a particular item, for example an item likely to be mailed (determined, for example, by the projection system 100 detecting that the customer 202 brings the item into the post office). Similarly, the projection system 100 may identify to the customer 202 available resources (for example, self-service kiosk, passport window, no line at window X, etc.). Furthermore, when the customer 202 is carrying an item that is not packaged in a box, the projection system 100 may determine what size packaging is needed to mail the item and highlight the appropriate packaging using the presentation system 140. Such information can thus be used to allow the projection system 100 to improve customer experience at the location.

FIG. 2B provides a breakdown of equipment utilized by the projection system 100 of FIG. 1. Specifically, the breakdown shows the combination presentation system 205, which may include the camera system 130 (comprising one of the cameras 132), the intelligent control system 110 (or a connection thereto), and the presentation device 140, including the projector 142 and the robotic movable base introduced above. As discussed above, the movable base may allow the presentation system 140 to move around the environment 200 and display presentations to customers 202 anywhere in the environment 200. The connection to the interactive control system 110 may enable the interactive control system 110 to identify the most appropriate presentation for the customer 202 based on the analysis of the information collected about the customer 202 using the camera system 130 and/or the sensor system 120.

Figure 3:
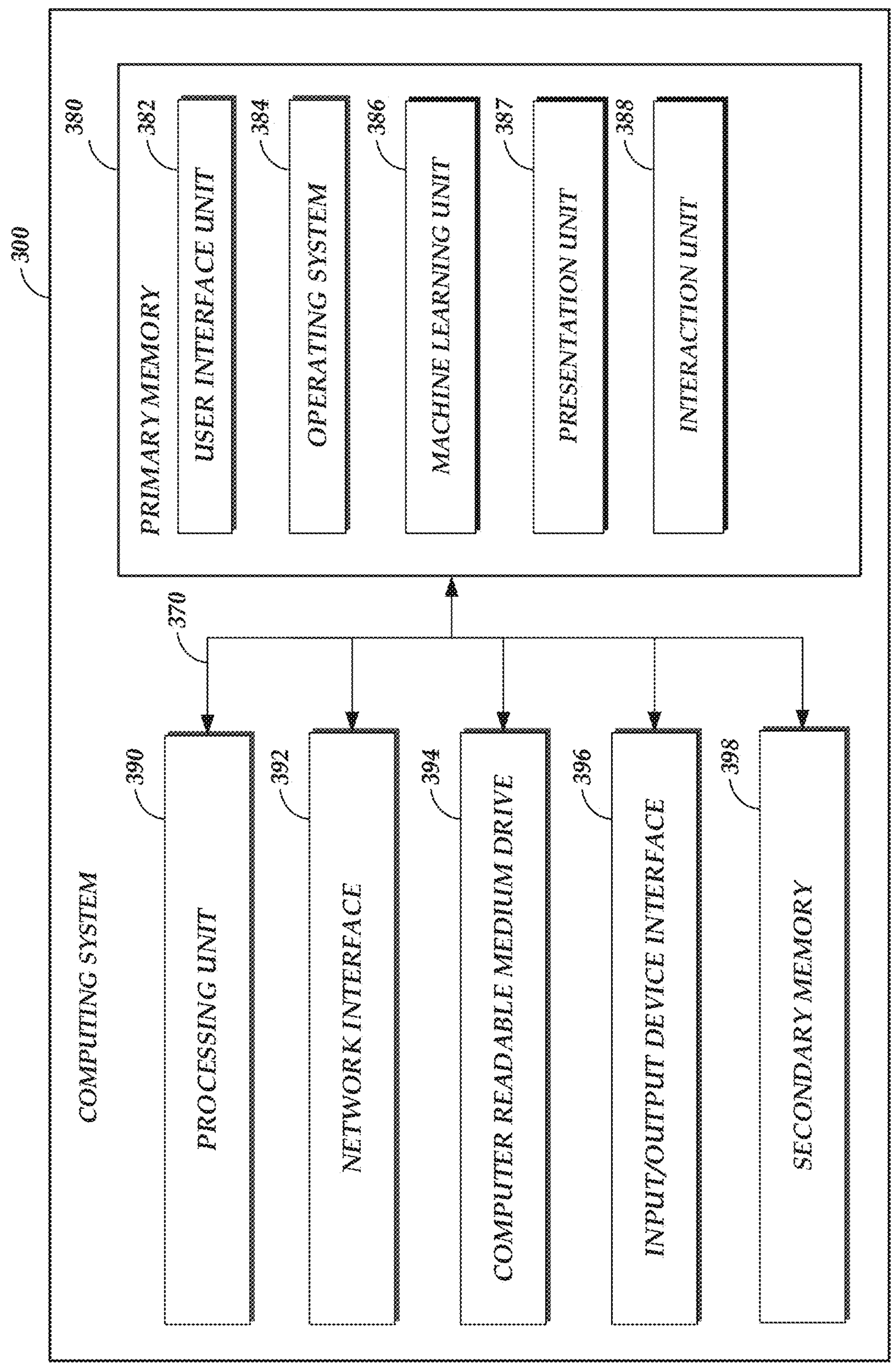
FIG. 3 depicts an example architecture of a computing system implemented in a projection system.

FIG. 3 depicts a general architecture of a computing system 300 implementing one or more of the interactive control system 110, the sensor system 120, the camera system 130, the presentation system 140, and the computing devices 105 of FIG. 1. The general architecture of the computing system 300 depicted in FIG. 3 includes an arrangement of computer hardware and software that may be used to implement aspects of the present disclosure. The hardware may be implemented on physical electronic devices, as discussed in greater detail below. The software may be implemented by the hardware described herein. The computing system 300 may include many more (or fewer) elements than those shown in FIG. 3. It is not necessary, however, that all of these generally conventional elements be shown in order to provide an enabling disclosure. Additionally, the general architecture illustrated in FIG. 3 may be used to implement one or more of the other components illustrated in FIG. 1.

As illustrated, the computing system 300 includes a processing unit 390, a network interface 392, a computer readable medium drive 394, and an input/output device interface 396, all of which may communicate with one another by way of a communication bus 370. The network interface 392 may provide connectivity to one or more networks or computing systems (for example, between one or more of the computing devices 105, the interactive control system 110, the sensor system 120 and sensors 122, the camera system 13 and cameras 132, and the presentation system 140 and projectors 142 and speakers 144). The processing unit 390 may thus receive information and instructions from other computing systems or services via the network. The processing unit 390 may also communicate to and from primary memory 380 and/or secondary memory 398 and further provide output information for an optional display (not shown) via the input/output device interface 396. The input/output device interface 396 may also accept input from an optional input device (not shown).

The primary memory 380 and/or secondary memory 398 may contain computer program instructions (grouped as units in some embodiments) that the processing unit 390 executes in order to implement one or more aspects of the present disclosure. These program instructions may be included within the primary memory 380, but may additionally or alternatively be stored within secondary memory 398. The primary memory 380 and secondary memory 398 correspond to one or more tiers of memory devices, including (but not limited to) RAM, 3D XPOINT memory, flash memory, magnetic storage, cloud storage objects or services, block and file services, and the like. In some embodiments, all of the primary memory 380 or the secondary memory 398 may utilize one of the tiers of memory devices identified above. The primary memory 380 is assumed for the purposes of description to represent a main working memory of the computing system 300, with a higher speed but lower total capacity than secondary memory 398.

The primary memory 380 may store an operating system 384 that provides computer program instructions for use by the processing unit 390 in the general administration and operation of the computing system 300. The memory 380 may further include computer program instructions and other information for implementing aspects of the present disclosure. For example, in one embodiment, the memory 380 includes a user interface unit 382 that generates user interfaces (and/or instructions therefor) for display upon a computing device, e.g., via a navigation and/or browsing interface such as a web browser or software application installed on the computing device.

In addition to and/or in combination with the user interface unit 382, the memory 380 may include a machine learning unit 386 that facilitates management and/or analysis of data collected by the sensors 122 and/or cameras 132 regarding customers 202 in the environment 200. Similarly, machine learning unit 386 may facilitate selection of presentations to provide the customers. The machine learning unit 386 may employ machine learning algorithms to better select or determine customer confusion or needs of assistance or entertainment based on customer actions, etc., as described above. Similarly, the machine learning unit 386 may employ machine learning algorithms to better select or determine which presentation will provide the best support to the customer. The presentation unit 387 facilitates creation, management, maintenance, and selection of presentations to be presented to the customer 202, for example based on analysis by the machine learning unit 386. A interaction unit 288 facilitates identification and management of interactions by the customer 202 with the presentations. For example, when the presentation is interactive, the interaction unit 288 may work with the cameras 132 and sensors 122 to identify customer interaction with the presentation and determine the particular interactions with the presentation. Accordingly, the presentation can adapt to customer interaction, enabling a customized and more fulfilling experience for the customer 202.

The computing system 300 of FIG. 3 is one illustrative configuration of such a device, of which others are possible. For example, while shown as a single device, the computing system 300 may, in some embodiments, be implemented as multiple physical host devices. In other embodiments, the computing system 300 may be implemented as one or more virtual devices executing on a physical computing device. While described in FIG. 3 as a computing system 300, similar components may be utilized in some embodiments to implement other devices shown in the projection system 100 of FIG. 1.

Figure 4:
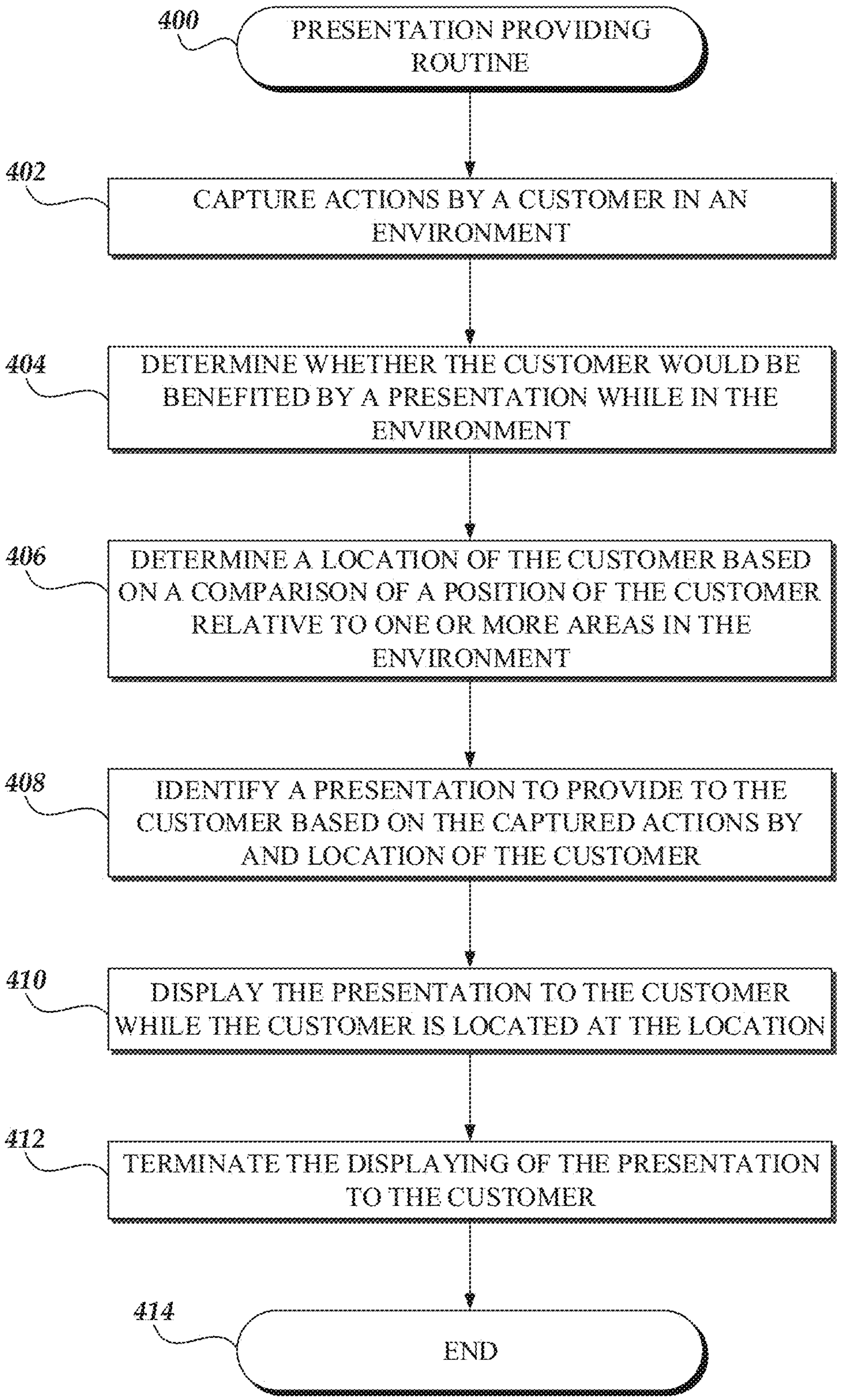
FIG. 4 is a flowchart of an exemplary method of providing presentations to customers in an environment according to exemplary methods and systems described herein.

FIG. 4 is a flowchart for an exemplary method 400 of providing presentations to customers in an environment according to exemplary methods and systems described herein. In some aspects, the method 400 discussed below with respect to FIG. 4 is performed by one or more of the components of the computing system 300 and/or the projection system 100, for example the interactive control system 110, the sensor system 120, the camera system 130, and the presentation system 140 discussed above with respect to FIGS. 1 and 3. For example, one or more of the components of the projection system 100 comprises the computing system 300 of FIG. 3. The system 300 may execute (and/or store in the primary memory 380 or computer readable medium drive 394) the instructions, which configure the processing unit 390 to perform the functions of method 400 discussed below. In some aspects, the method 400 includes additional or fewer steps than shown or discussed.

The method or routine 400 begins at block 402, where the system 100 captures actions by a customer 202 in an environment in which the image capture device is installed. In some instances, the actions of the customer 202 are captured by one or more cameras 132 of the camera system 130 and/or one or more sensors 122 of the sensor system 120. In some instances, the actions of the customer 202 are captured by a mobile device (for example, one of the input devices 105). Once the customer 202 actions are captured by the sensing device, the method 400 proceeds to block 404.

At block 404, a processor, for example, the processing unit 390 of the FIG. 3, may analyze the captured data from the sensing device to determine whether the customer 202 would be benefited by a presentation while in the environment. In some instances, such an analysis comprises applying one or more machine learning models or other analysis tools to determine whether the customer 202 is one or more of confused, bored, frustrated, annoyed, preoccupied, and so forth. In some embodiments, the processing unit 390 is in data communication with one or more of the sensors 122, the sensor system 120, the input device 105, the cameras 132, and/or the camera system 130. Once the method 400 determines whether the customer would or would not be benefited by the presentation, the method 400 progresses to block 406.

At block 406, the system 300 determines a location of the customer 202 based on a comparison of a position of the customer 202 relative to one or more areas in the environment 200. In some instances, the determination comprises applying one or more analysis models (for example, geofencing models or systems) and so forth to determine where the customer 202 is located in the environment 200. For example, one of the cameras 132 identifies the location of the customer in the environment 200 based on areas identified by the processing unit 390 in the environment. For example, such a determination may comprise the processing unit 390 identifying the location of the customer 202 using data from one or more of the sensors 122, the sensor system 120, the input device 105, the cameras 132, and/or the camera system 130. Once the method 400 determines whether the location of the customer 202, the method 400 progresses to block 408.

At block 408, the system 300 identifies a presentation to provide to the customer 202. As described herein, selection of the presentation may comprise applying various analysis and/or models to one or more of the available presentations, the determined location of the customer 202, and the captured actions of the customer 202. In some instances, certain of the analyses and/or models helps select which presentation is most appropriate for the customer 202. In some embodiments, the analysis and/or models utilize information from a plurality of environments 200 to better select the appropriate presentation based on selections at other environments 200 and/or feedback received from one or more of the environments 200.

At block 410, the system 300 performs the method 400 to display the presentation to the customer while the customer is located at the location. Because the presentation may be location dependent, the system 300 may monitor the customer's location while the presentation is being displayed. In some instances, the presentation is displayed via a projector on a flat or substantially flat surface near the customer 202 while the customer 202 is in the location. In some instances, the presentation is displayed on the input device 105 of the customer 202. In some instances, the system 300 prompts the customer 202 to determine whether the customer 202 needs assistance. The prompt may ask the customer 202 whether the customer 202 would prefer an employee help the customer 202 or virtual/computerized assistance. If the system 300 determines that the customer 202 moves from the location, for example out of a corresponding area, then the presentation may be terminated. Once the presentation is displayed to the customer 202, the method 400 proceeds to block 412.

At block 412, the method 400 and the system 300 terminate the displaying of the presentation to the customer 202. In some instances, the termination is based on the customer 202 moving out of the detected location, detection of the presentation being completed, or detection of a successful transaction by the customer 202. In some instances, the presentation may include an option for the customer 202 to discontinue or terminate the presentation, for example if the customer 202 does not find the presentation helpful. Additionally, the customer 202 may be prompted for feedback regarding the presentation and corresponding aspects, for example timeliness, accuracy of confusion/need for assistance detection, and so forth.

In some instances, though not shown in FIG. 4, identifying the presentation to provide to the customer 202 comprises identifying an approximate age of the customer 202, identifying a type of presentation for the presentation to the customer 202, and identifying a subject matter for the presentation to the customer 202. In some instances, such identifying of age is dependent on one or more models or algorithms configured to determine age of the customer 202 based on various inputs, including clothing, physical features, movements, and so forth. In some instances, user profile information associated with the customer's input device 105 or the like may indicate the age of the customer 202 and/or areas where the customer 202 often needs assistance. In some instances, the presentations provided can be tailored to the customer 202. For example, during the holidays, the self-service kiosk may have presentations associated therewith that can access and present to the customer 202 address information for family or friends to which the customer often sends items but may not have written down or accessible. Furthermore, identifying the subject matter for the presentation may comprise identifying, based on the location of the customer, a good or service with which the customer needs assistance. For example, the system 300 may identify the customer 202 is standing in the wall user zone 231 while looking at the item wall 230 and determine that the customer 202 needs assistance selecting a size of packaging for an item. The method 400 can further comprise identifying, via the sensing device, interaction of the customer 202 with the presentation while the customer 202 is located at the location. Thus, while the presentation is displayed to the customer 202, the customer 202 can interact with the presentation, for example asking specific questions or identifying specific issues, answering prompts that are part of the presentation, and so forth.

In some instances, the method 400 comprises identifying a plurality of customers based on detecting entry of the plurality of customers into the environment, wherein an order in which presentations are displayed to the plurality of customers is based, at least in part, on an order in which the plurality of customers entered the environment. Thus, in some instances, assistance to customers 202 is on a first-come, first-served basis. In some instances, a likelihood of need of assistance by customers 202 may be ranked or graded, for example based on an analysis of time spent in an area or zone, time spent looking confused, bored, preoccupied, etc., time spent in the environment, historical information for the customer 202, items carried by the customer, and the like. In some embodiments, the method 400 and the system 300 further transmit a notification to an employee based on a determination that the presentation did not result in the successful completion of the transaction or a determination that no presentation is available to help the customer 202. The notification may include details of the customer's actions that triggered the presentation, customer actions during the presentation, and/or customer historical information.

Those of skill will recognize that the various illustrative logical blocks, modules, circuits, and algorithm steps described as follows, and in connection with the embodiments disclosed herein may be implemented as electronic hardware, software stored on a computer readable medium and executable by a hardware processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor reads information from, and write information to, the storage medium. In the alternative, the storage medium may be integral to the processor. The processor and the storage medium may reside in an ASIC.

While the above detailed description has shown, described, and pointed out novel features of the development as applied to various embodiments, it will be understood that various omissions, substitutions, and changes in the form and details of the device or process illustrated may be made by those skilled in the art without departing from the spirit of the development. As will be recognized, the present development may be embodied within a form that does not provide all of the features and benefits set forth herein, as some features may be used or practiced separately from others. All changes which come within the meaning and range of equivalency of the claims are to be embraced within their scope.

A person skilled in the art will recognize that each of these sub-systems may be inter-connected and controllably connected using a variety of techniques and hardware and that the present disclosure is not limited to any specific method of connection or connection hardware.

The technology is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, a microcontroller or microcontroller based system, programmable customer electronics, network PCs, minicomputers, mainframe computers, distributed computing environments that include any of the above systems or devices, and the like.

As used herein, instructions refer to computer-implemented steps for processing information in the system. Instructions may be implemented in software, firmware or hardware and include any type of programmed step undertaken by components of the system.

A microprocessor may be any conventional general purpose single- or multi-chip microprocessor such as an Intel, AMD, or other processor, including single, dual, and quad-core arrangements, or any other contemporary processor. In addition, the microprocessor may be any conventional special purpose microprocessor such as a digital signal processor or a graphics processor. The microprocessor typically has conventional address lines, conventional data lines, and one or more conventional control lines.

The system may be used in connection with various operating systems such as Linux®, UNIX®, MacOS® or Microsoft Windows®.

The system control may be written in any conventional programming language such as C, C++, BASIC, Pascal, .NET (e.g., C#), or Java, and ran under a conventional operating system. C, C++, BASIC, Pascal, Java, and FORTRAN are industry standard programming languages for which many commercial compilers may be used to create executable code. The system control may also be written using interpreted languages such as Perl, Python or Ruby. Other languages may also be used such as PHP, JavaScript, and the like.

The foregoing description details certain embodiments of the systems, devices, and methods disclosed herein. It will be appreciated, however, that no matter how detailed the foregoing appears in text, the systems, devices, and methods may be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment may be included with other depicted embodiments in any combination. For example, any of the various components described herein and/or depicted in the Figures may be combined, interchanged or excluded from other embodiments.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

The term "comprising" as used herein is synonymous with "including," "containing," or "characterized by," and is inclusive or open-ended and does not exclude additional, unrecited elements or method steps.

All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

The above description discloses several methods and materials of the present development. This development is susceptible to modifications in the methods and materials, as well as alterations in the fabrication methods and equipment. Such modifications will become apparent to those skilled in the art from a consideration of this disclosure or practice of the development disclosed herein. Consequently, it is not intended that this development be limited to the specific embodiments disclosed herein, but that it cover all modifications and alternatives coming within the true scope and spirit of the development as embodied in the attached claims.

As will be understood by those of skill in the art, in some embodiments, the processes set forth in the following material may be performed on a computer network. The computer network having a central server, the central server having a processor, data storage, such as databases and memories, and communications features to allow wired or wireless communication with various parts of the networks, including terminals and any other desired network access point or means.

What is claimed is:

1. A method comprising:

dividing an environment into a plurality of zones, each of the zones having at least one camera of a plurality of cameras to monitor each of the plurality of zones and at least one media projector of a plurality of media projectors mounted therein;

capturing, via the at least one camera installed in the environment, actions of a customer in the environment and an image of an item the customer is carrying;

determining, via one or more processors, one of the plurality of zones in which the actions are captured based at least in part on which of the plurality of cameras captures the actions of the customer;

determining, via the one or more processors, a packaging size for shipping the item based at least in part on the image of the item;

identifying, via the one or more processors, packaging for shipping the item, the packaging corresponding to the determined packaging size;

highlighting, via the at least one media projector mounted in the determined one of the plurality of zones, the identified packaging corresponding to the determined packaging size;

detecting, via the at least one camera, a successful completion of a transaction by the customer; and terminating, via the one or more processors, the highlighting of the identified packaging based on the detection of the successful completion of the transaction by the customer.

2. The method of claim 1, wherein the actions by the customer comprise facial expressions, including one or more of confused, bored, frustrated, annoyed, and preoccupied.

3. The method of claim 1, further comprising identifying, via the one or more cameras, interaction of the customer with the highlighted packaging while the customer is located in the determined one of the plurality of zones.

4. The method of claim 1, further comprising identifying a plurality of customers based on detecting entry of the plurality of customers into the environment, wherein an order in which packaging is highlighted is based, at least in part, on an order in which the plurality of customers entered the environment.

5. The method of claim 1, further comprising transmitting a notification to an employee based on a determination that the highlighting of the identified packaging did not result in the successful completion of the transaction, wherein the notification includes details of customer actions during the highlighting of the identified packaging.

6. The method of claim 1, wherein highlighting the identified packaging comprises identifying the at least one media projector from the plurality of media projectors based on the determined one of the plurality of zones in which the actions are captured.

7. The method of claim 6, wherein the at least one media projector comprises a video projector.

8. The method of claim 1, wherein the environment is a post office.

9. A system comprising:

a plurality of cameras configured to capture actions by a customer and an image of an item the customer is carrying in an environment in which the plurality of cameras are installed, wherein the environment is divided into a plurality of zones, and wherein at least one of the plurality of cameras is configured to monitor each of the plurality of zones, each of the zones having at least one media projector of a plurality of media projectors mounted therein; and one or more processors in data communication with the plurality of cameras, the one or more processors configured to:

determine one of the plurality of zones in which the actions are captured based at least in part on which of the plurality of cameras captures the actions of a customer;

determine a packaging size for shipping the item based at least in part on the image of the item;

identify packaging in the determined one of the plurality of zones, the packaging corresponding to the determined packaging size;

cause the at least one media projector mounted in the determined one of the plurality of zones to highlight the identified packaging;

determine completion of a successful transaction by the customer; and terminate highlighting of the identified packaging based on the determination of completion of the successful transaction by the customer.

10. The system of claim 9, wherein the captured actions by the customer comprise facial expressions, including one or more of confused, bored, frustrated, annoyed, and preoccupied.

11. The system of claim 9, wherein the one or more processors are further configured to receive an interaction of the customer with the highlighted packaging while the customer is located in the determined one of the plurality of zones.

12. The system of claim 9, wherein the one or more cameras are further configured to identify a plurality of customers based on detecting entry of the plurality of customers into the environment, wherein an order in which packaging is highlighted is based, at least in part, on an order in which the plurality of customers entered the environment.

13. The system of claim 9, wherein the one or more processors are further configured to transmit a notification to an employee based on a determination that the highlighting of the identified packaging did not result in the successful completion of the transaction, wherein the notification includes details of customer actions during the presentation highlighting of the identified packaging.

14. The system of claim 9, wherein the one or more processors are further configured to select the at least one media projector from the plurality of media projectors in the environment based on the determined one of the plurality of zones.

15. The system of claim 9, wherein the at least one media projector comprises a video projector.

* * * * *